UNITED STATES PATENT OFFICE.

ISABEL HOTSON-TAIT, OF SYDNEY, NEW SOUTH WALES, AUSTRALIA.

COMPOSITION FOR SEALING CANS AND THE LIKE THAT CONTAIN PERISHABLE FOODS.

1,386,620.  Specification of Letters Patent.  Patented Aug. 9, 1921.

No Drawing.  Application filed November 8, 1919. Serial No. 336,715.

*To all whom it may concern:*

Be it known that I, ISABEL HOTSON-TAIT, subject of the King of Great Britain and Ireland, residing at 247 Elizabeth street, Sydney, in the State of New South Wales, Commonwealth of Australia, have invented new and useful Improvements in a Composition for Sealing Cans and the like that Contain Perishable Foods, of which the following is a specification.

It has been the usual custom to seal tins, cans, and the like, with a metal solder, but for many reasons this mode is objectionable.

The composition that forms the subject of the present application for Letters Patent has been devised with a view to supersede the old method.

The composition comprises the following substances in the relative quantities as set forth.

| | |
|---|---|
| Resin | 6 ozs. |
| Methylated spirit | 6 ozs. |
| Carbonate of iron | 3 ozs. |
| Paste comprising 3 ozs. of flour with water to | 1 pint. |
| Molasses | 7 ozs. |
| Pure nitric acid, chemically known as aqua fortis | $\frac{1}{4}$ oz. |

The composition in the above proportions and prepared in the manner hereinafter set forth will make one imperial quart.

The resin must be dissolved in the methylated spirit. The flour paste must be made with cold water. The nitric acid must be mixed with the flour paste and boiled.

When the mixture is quite cold, introduce the carbonate of iron, mixing well, then thoroughly incorporate therewith the dissolved resin, finally add the molasses and mix carefully. The composition may then be packed and will be ready for use.

The use of carbonate of iron produces a compound of reddish color; other substances may be substituted which will yield different colors, for instance:—for brown of different shades, carbonate of magnesia, calcium carbonate or oxid of zinc.

The composition is of a viscous character and should be applied so as to cover the seams or apertures to be sealed.

I claim:—

A preparation for sealing tins and the like consisting of a mixture of resin, methylated spirit, carbonate of iron, flour paste, molasses, and nitric acid.

In testimony whereof I have signed my name to this specification in the presence of two subscribing witnesses.

ISABEL HOTSON-TAIT.

Witnesses:
 A. MASSON,
 H. C. CAMPBELL.